(12) United States Patent
Roethinger et al.

(10) Patent No.: US 11,843,112 B2
(45) Date of Patent: Dec. 12, 2023

(54) COMPOSITE MATERIAL

(71) Applicant: SGL CARBON SE, Wiesbaden (DE)

(72) Inventors: Johannes Roethinger, Meitingen (DE); Christian Schreiner, Meitingen (DE); Bernt Ketterer, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 567 days.

(21) Appl. No.: 16/616,625

(22) PCT Filed: Jun. 28, 2018

(86) PCT No.: PCT/EP2018/067485
§ 371 (c)(1),
(2) Date: Nov. 25, 2019

(87) PCT Pub. No.: WO2019/002508
PCT Pub. Date: Jan. 3, 2019

(65) Prior Publication Data
US 2020/0194780 A1    Jun. 18, 2020

(30) Foreign Application Priority Data
Jun. 29, 2017 (DE) .................. 10 2017 211 086.4

(51) Int. Cl.
*H01M 4/587* (2010.01)
*H01M 4/36* (2006.01)
(Continued)

(52) U.S. Cl.
CPC ........... *H01M 4/364* (2013.01); *H01M 4/386* (2013.01); *H01M 4/587* (2013.01);
(Continued)

(58) Field of Classification Search
CPC ...... H01M 4/364; H01M 4/386; H01M 4/587; H01M 10/0525; H01M 10/054;
(Continued)

(56) References Cited

U.S. PATENT DOCUMENTS 6,143,216 A    11/2000   Loch et al.
7,871,727 B2   1/2011    Obrovac et al.
(Continued)

FOREIGN PATENT DOCUMENTS

DE    10 2013 211 388 A1    12/2014
EP    1730800 B1              5/2008
(Continued)

OTHER PUBLICATIONS

International Search Report dated Aug. 28, 2018 in corresponding International application No. PCT/EP2018/067485; 4 pages.
(Continued)

*Primary Examiner* — Cynthia K Walls
(74) *Attorney, Agent, or Firm* — Maier & Maier, PLLC

(57) ABSTRACT

A novel composite material which includes silicon and carbon, the amount of silicon being 1-80 wt.-% and at least 90 wt.-% of the composite material being in a density range between a lower density threshold value $p^*_1$ and an upper density threshold value $p^*_2$. The density threshold values have the following relation: $\rho^*_{1,2} = (1 \pm \delta) \cdot \rho$, wherein $\rho$ is the mean density of the composite material and $\pm \delta$ is the variation range between the upper density threshold value
(Continued)

$\rho^*_2$ and the lower density threshold value $\rho^*_1$, the amount of $\delta$ being <0.10.

8 Claims, 5 Drawing Sheets

(51) Int. Cl.
- *H01M 4/38* (2006.01)
- *H01M 10/0525* (2010.01)
- *H01M 10/054* (2010.01)
- *H01M 4/02* (2006.01)

(52) U.S. Cl.
CPC ..... *H01M 10/054* (2013.01); *H01M 10/0525* (2013.01); *H01M 2004/021* (2013.01); *H01M 2004/027* (2013.01)

(58) Field of Classification Search
CPC ..... H01M 2004/021; H01M 2004/027; H01M 10/052; H01M 4/0471; H01M 4/625; H01M 4/1395; H01M 4/366; Y02E 60/10; H01G 11/24; H01G 11/38; H01G 11/42; H01G 11/50; C01B 32/05; C01B 33/02; C01P 2004/80; C01P 2006/40
See application file for complete search history.

(56) References Cited

U.S. PATENT DOCUMENTS

| | | |
|---|---|---|
| 7,906,238 B2 | 3/2011 | Le |
| 9,281,129 B2 | 3/2016 | Fukuoka et al. |
| 2010/0035128 A1 | 2/2010 | Scordilis-Kelley et al. |
| 2012/0244428 A1 | 9/2012 | Park et al. |
| 2013/0004846 A1 | 1/2013 | Kim et al. |
| 2014/0234721 A1 | 8/2014 | Yang et al. |
| 2014/0266066 A1 | 9/2014 | Turon Teixidor et al. |

FOREIGN PATENT DOCUMENTS

| | | |
|---|---|---|
| EP | 2 430 686 B1 | 2/2015 |
| JP | 2011-142021 A | 7/2011 |
| JP | 2012084521 A | 4/2012 |
| WO | 01/96847 A1 | 12/2001 |
| WO | 2008/139157 A1 | 11/2008 |
| WO | 2014/095823 A1 | 6/2014 |

OTHER PUBLICATIONS

EP 1730800 A2 published on Dec. 13, 2006; cited in Specification; English-language Abstract Attached; 2 pages.

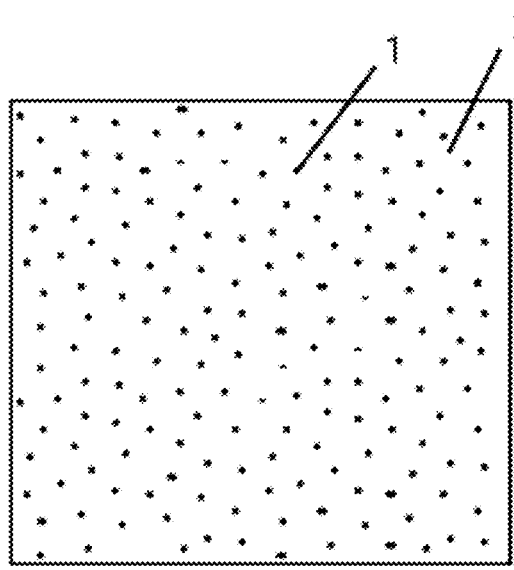
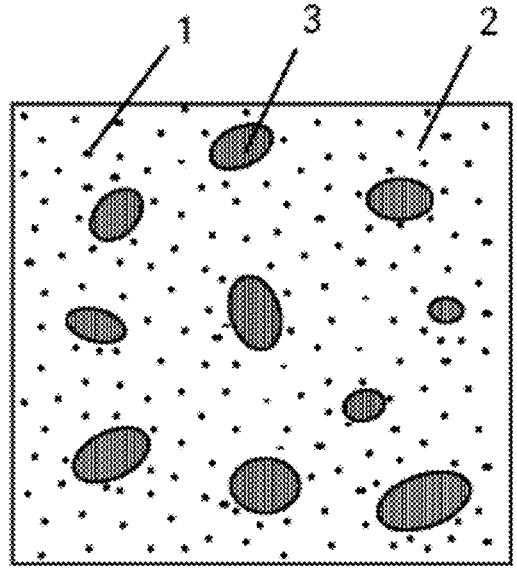
Fig. 1a          Prior Art          Fig. 1b
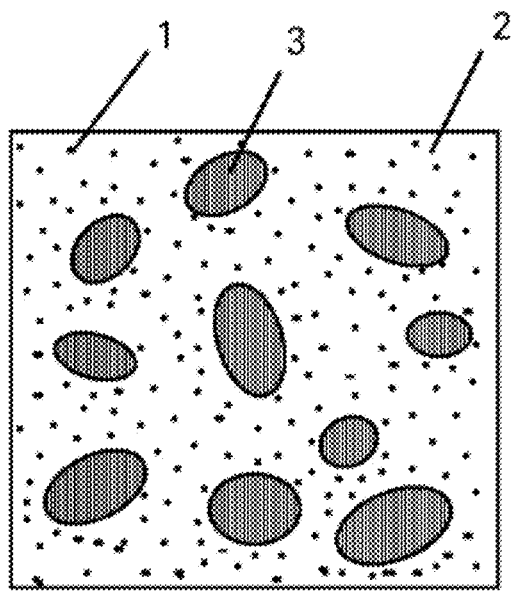
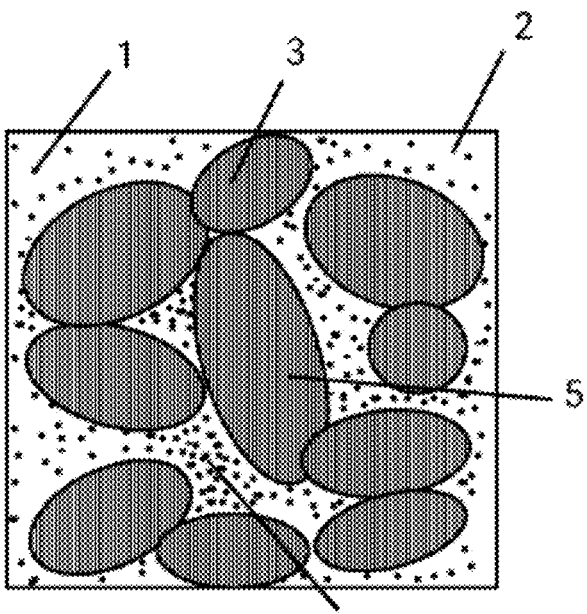
Fig. 1c          Fig. 1d
Prior Art

COMPOSITE MATERIAL

FIELD

The present invention relates to a novel composite material as well as to the method for production thereof and to use thereof in lithium-ion batteries.

BACKGROUND

Lithium-ion batteries are rechargeable energy storage systems (secondary batteries) which have the highest energy density, which is, for example, currently up to 250 Wh/kg, among chemical and electrochemical energy accumulators. Lithium-ion batteries are used in particular in the area of portable electronic devices, for example for laptops, computers or mobile phones, and in the area of transport means, for example for bicycles or cars having electric drives.

When it comes to electric mobility, higher energy densities of lithium-ion batteries are necessary in order to increase the range of vehicles. For portable electronic devices, they are necessary to prolong useful life on one battery charge.

Lithium-ion batteries comprise an anode (negative electrode), a cathode (positive electrode) and a separator, which separates the anode and cathode from each other, and an electrolyte which saturates the anode, cathode and separator. The composition of an active material, which is also referred to as an anode material, a binder (for example sodium carboxymethyl cellulose (CMC), styrene-butadiene rubber (SBR), lithium polyacrylic acid or polyacrylic acid (PAA), polyvinylidene difluoride (PVDF) and variants thereof), conductive additives (for example carbon blacks, graphenes, single-wall carbon nanotubes (SWCNTs), multi-wall carbon nanotubes (MWCNTs), carbon nanohorns, carbon fibres, vapour-grown carbon fibres, porous carbons or mixtures thereof) and current collectors (for example copper foil) is referred to in the following as anode.

The active material is the material which takes part in the electrochemical reaction.

To be able to meet the requirements of a higher energy density, lithium alloy anodes consisting of metals or metalloids such as silicon, germanium, tin or lead are desirable because said lithium alloy anodes have a significantly higher theoretical specific capacity, i.e. storage capacity for lithium, than graphite, which is at present usually used as an anode material in lithium-ion batteries. However, lithium-ion batteries having lithium alloy anodes have a lower capacity retention after many charge/discharge cycles, i.e. a lower cycle stability. The loss of capacity is a result of the large volume change of up to approximately 300% during the alloy formation between lithium and the alloying metal. The constant volume change in each lithiation or delithiation step results in heavy stressing of the active material. This can cause the electrical contact between the individual particles and/or between the particles and the current collector to be lost, as a result of which the particles can no longer take part in the charging or discharging processes in the battery and thus become inactive due to the lost electrical contact. This causes a loss of capacity. A further problem is the surface change of the particles associated with the volume change and the resulting reformation of a passivating coating layer (the so-called solid electrolyte interphase, SEI), which is electrically insulating but permeable for lithium ions, on the surface of the particles due to the reaction with the electrolyte. Because the SEI is not sufficiently flexible, it cannot compensate for the surface changes according to the customary explanatory models. Therefore, each charge/discharge cycle results in a partial reformation of the SEI, which leads to an irreversible loss of electrolyte and lithium. The loss of the lithium directly or indirectly originating from the cathode results in an irreversible loss of capacity of the cell. The loss of electrolyte and the accumulation of SEI residues around the particles and in the pores of the electrode both result in an increase in the cell resistance, for example due to gradual 'drying out' of the cell or clogging of the porosity, which additionally reduces the performance of the cell and reduces the cycle stability thereof indirectly. To avoid the large volume expansion and the reaction with the electrolyte, various approaches are followed:

pressurisation of the anode by means of external pressure (US 20100035128 A, US 20140266066 A1)

use of nano silicon as an anode material (in a pure form or as a physical mixture with graphite) (WO 2008139157 A1, WO 2001096847 A1, DE 102013211388 A1, EP 1730800 A2)

Si alloys as an anode material (U.S. Pat. No. 7,871,727 B2, U.S. Pat. No. 7,906,238 B2)

silicon oxide particles ($SiO_x$) as an anode material (U.S. Pat. No. 9,281,129 B2, JP2011142021; for example, WO 2014/095823 A1 describes a powder comprising a mixture containing carbon and $SiO_x$, with $0<x<1$, the $SiO_x$ consisting of a nanometric composite of crystalline $SiO_2$ and amorphous Si.)

C—Si composite use of electrolyte additives (EP 2430686 B1)

porous electrodes as an anode material (U.S. Pat. No. 6,143,216 A)

carbon-coated nano silicon as an anode material of nano Si (US 20140234721 A1, JP2012084521)

The use of pure nano silicon has a few disadvantages. The large surface area of nano silicon causes greater SEI formation and thus an increased number of irreversible losses. In addition, only an unstable SEI forms on silicon, which results in the continuous reformation and growth of the SEI, as a result of which an electrical resistance is created. Furthermore, the poor processability (for example reliability, production of homogeneous electrode pastes, a higher binder requirement due to a larger surface area) of nano silicon powders should be mentioned. In addition, there is an increased probability of losses of contact with the current collector, as a result of which there is a greater need for conductive additives, which in turn leads to a greater number of irreversible losses.

Another possibility is to combine silicon particles with a carbon matrix and ideally to embed the silicon in the carbon. The C—Si composite material obtained in this manner, which can be used as an active material, weakens the volume change of the silicon and direct contact of the silicon with the electrolyte is largely avoided. C—Si composite material and composite material are used synonymously in the following. Another important advantage of C—Si composite materials in comparison with physical mixtures of graphite and nano silicon is the possibility of achieving a mean particle size in the micrometre range for the composite materials despite the use of nano silicon. Thus, the size of the composite particles is comparable to the graphite particles currently used, as a result of which handling and processing the composite material is more easily possible in the production facilities already designed for graphite anodes than would be possible in the case of a pure nano material. In addition, the volume expansion of the nano silicone is reduced in the C—Si composite material. A further advantage over physical mixtures is that a more stable SEI forms.

However, the partial separation of silicon and the carbon matrix during the thermal treatment has proved to be a problem. Even if a homogeneous/uniform mixture of silicon, the further additive particles and the carbon precursor used was produced in the preceding mixing process (so-called green mix), the observed separation during the thermal treatment of the green mix to make the product results in partial enrichment and agglomerate formation of silicon as well as accordingly to a depletion of silicon in other regions of the material after the thermal treatment. Thus, an inhomogeneity of the distribution of silicon in carbon occurs, i.e. there are local/microscopic regions that have less or no silicon and local/microscopic regions that have significantly more silicon than would be expected on average, for example, according to the average macroscopic composition. If this inhomogeneity occurs in ranges of orders of magnitude that are greater than or equal to the desired mean particle size of the final product, this inhomogeneity of the distribution of the silicon results in disadvantageous effects both in the further processing of the material and in the final application of the product.

The separation is in particular observed when thermoplastic carbon precursors are used, for example in the case of pitches, and here, once again, in particular in the case of pitches having particularly small amounts of contaminants (low ash content (<1%) and low amounts insoluble in quinoline (<10%)) which are advantageous for use in producing active materials for batteries. When these pitches are used, a marked (meso)phase growth and thus formation of anisotropic regions can be observed during the thermal treatment for conversion to carbon (carbonisation), which result in separation during the carbonisation process.

To use the C—Si composite material as an active material, said C—Si composite material is ground to the desired particle size. When the material is ground, particles are also produced from the silicon-free or silicon-poor regions, which particles contain little to no silicon. Owing to the lack of silicon, these particles thus have a significantly lower specific capacity than is desired on average and thus contribute to the overall capacity of the anode only to a below-average extent. Nevertheless, SEI formation also takes place on these particles, as a result of which these particles also contribute to the irreversible formation losses. Thus, such silicon-free or silicon-poor particles are undesirable in the active material of the anode for lithium-ion batteries.

To the extent that the silicon is locally depleted or completely absent in some regions of the carbon matrix when inhomogeneities occur, it is enriched in other regions of the composite material. This in turn results in the particles forming from these regions when the material is ground, which particles have a significantly higher silicon content or a significantly lower carbon content than desired. As a result, the silicon is more poorly embedded in the carbon matrix in these particles. In the anode, this results in the particles having a very high specific capacity, as a result of which, for example, a very pronounced volume change occurs when the particles are charged and discharged due to the high silicon content, which can, for example, result in the destruction of the C—Si particle and/or in the disruption of the electrode structure. In addition, the considerable enrichment of the silicon or of the lithiated silicon in some particles of the anode results in a corresponding, locally non-uniform current density distribution to or from the anode, which can, for example, promote the formation of lithium dendrites, as a result of which the battery becomes less safe and, in extreme cases, can even be damaged and destroyed if an internal short circuit forms. A further problem caused by the enrichment of the silicon in some regions after the thermal treatment of the mixture relates to the grinding process for creating a powder itself: Silicon is thus increasingly released from the silicon-rich regions of the composite material during grinding because the silicon in the silicon-rich regions is more poorly embedded in the carbon/carbon matrix and because these regions therefore act as mechanical weak points or predetermined breaking points, so to speak. Thus, when the composite material is mechanically stressed during the grinding process, the silicon can particularly easily be broken out of and released from the silicon-rich regions. In mills having a particle retention system (for example a sifter) that allows the smallest particle (for example <1 µm) to pass through, this results in a significant loss of silicon in the final product because, for example, the nano silicon used can pass through this retention system. Due to the high costs of nano silicon, this loss is disadvantageous. In mills that, in contrast, retain all of the material (e.g. closed ball mills or mills having fine particulate filters), the release of the nano silicon results in an enrichment of the product with unbound nano silicon. Even if no silicon is lost as a result of this, this is also disadvantageous because the higher content of nano particles, for example, worsens the handling of the product powder (for example in terms of safety) and makes the processing of the material into an anode more difficult (for example a higher specific surface area results in a higher binder requirement, a greater effort required to disperse the particles, an increased tendency towards agglomeration, potentially worse electrode adhesion and worse compactability of the electrode). The released nano silicon ultimately results in a worsening of the electrochemical properties of the anode due to the increased exposed surface area of silicon in the electrode because this leads, for example, to non-uniform loading during lithium incorporation, which in turn results in a loss of capacity or in increased SEI formation, thus reducing the service life of the lithium-ion battery.

SUMMARY

The object of the invention is to provide an easily accessible novel composite material for anodes of lithium-ion batteries that has a significantly higher specific capacity than graphite, can be processed like conventional graphite materials in production facilities already designed for graphite anodes, and makes increased operational safety of the battery possible.

The object is achieved by a composite material comprising silicon and carbon, the content of silicon being 1-80 wt.-%, preferably 2-60 wt.-%, particularly preferably 5-50 wt.-%, and at least 90 wt.-% of the composite material being in a density range between the lower density threshold value $\rho^*_1$ and the upper density threshold value $\rho^*_2$, the density threshold values $\rho^*_{1,2}$ being characterised by the following relation:

$$\rho^*_{1,2} = (1 \pm \delta) \cdot \rho$$

wherein $\rho$ is the mean density of the composite material and $\pm\delta$ is the variation range between the upper density threshold value $\rho^*_2$ and the lower density threshold value $\rho^*_1$, the amount of $\delta$ being <0.10.

In a particularly preferred composite material according to the invention, the amount of silicon is 10-75 wt.-%, in particular 15-70 wt.-%, very particularly preferably 20-65 wt.-%, for example 20 to 60 wt.-%.

The composite material according to the invention for lithium-ion batteries has a substantially homogeneous distribution of components, as a result of which non-uniform loading during lithium incorporation, non-uniform volume effects and unnecessary material losses are avoided during grinding.

Although a high degree of homogeneity of the composite material would be desirable, it has been found that the composite materials obtained using the method according to the invention generally only approximately achieve complete homogeneity. It is often the case that at least 3 wt.-%, 5 wt.-% or even 10 wt.-% of the composite material is in density range(s) outside a range extending from a lower density threshold value $\rho^*_3$ to an upper density threshold value $\rho^*_4$, the density threshold values $\rho^*_{3,4}$ being characterised by the following relation:

$$\rho^*_{3,4} = (1 \pm \delta_{min}) \cdot \rho$$

wherein $\rho$ is the mean density of the composite material and $\pm \delta_{min}$ is the variation range between the upper density threshold value $\rho^*_4$ and the lower density threshold value $\rho^*_3$, the amount of $\delta_{min}$ being 0.005, for example 0.01.

The mean density $\rho$ of the composite material is given by the following equation:

$$\rho = \left( \frac{\prod_{i=1}^{n} \rho_i}{\sum_{i=1}^{n} \left( x_i \cdot \prod_{\substack{j=1 \\ j \neq i}}^{n} \rho_j \right)} \right)$$

where $0 \leq x_i \leq 1$ and $1 = \sum_{i=1}^{n} x_i$, $n > 1$ and $j \neq i$.

For example, the following relation applies to a composite material having four components (n=4):

$$\rho = \left( \frac{\rho_1 \rho_2 \rho_3 \rho_4}{x_1 \rho_2 \rho_3 \rho_4 + x_2 \rho_1 \rho_3 \rho_4 + x_3 \rho_1 \rho_2 \rho_4 + x_4 \rho_1 \rho_2 \rho_3} \right)$$

The four components can be, for example, silicon, graphite, carbon black and amorphous carbon from the carbon precursor, as shown in example 3c.

Thus, the following relation applies to the density threshold values ($\rho^*_{1,2}$) having the variation range $\pm \delta$:

$$\rho^*_{1,2} = (1 \pm \delta) \cdot \rho = (1 \pm \delta) \left( \frac{\prod_{i=1}^{n} \rho_i}{\sum_{i=1}^{n} \left( x_i \cdot \prod_{\substack{j=1 \\ j \neq i}}^{n} \rho_j \right)} \right)$$

where $0 \leq x_i \leq 1$ and $1 = \sum_{i=1}^{n} x_i$, $n > 1$ and $j \neq i$.

For example, the following relation applies to a composite material having four components (n=4 and $\delta$=0.2):

$$\rho^*_1 = (1 - 0.2) \cdot \rho = 0.8 \cdot \left( \frac{\rho_1 \rho_2 \rho_3 \rho_4}{x_1 \rho_2 \rho_3 \rho_4 + x_2 \rho_1 \rho_3 \rho_4 + x_3 \rho_1 \rho_2 \rho_4 + x_4 \rho_1 \rho_2 \rho_3} \right)$$

-continued $$\rho^*_2 = (1 + 0.2) \cdot \rho = 1.2 \cdot \left( \frac{\rho_1 \rho_2 \rho_3 \rho_4}{x_1 \rho_2 \rho_3 \rho_4 + x_2 \rho_1 \rho_3 \rho_4 + x_3 \rho_1 \rho_2 \rho_4 + x_4 \rho_1 \rho_2 \rho_3} \right)$$

$x_i$ refers to the mass fractions of the individual components i of which the composite material consists after it has been subjected to all the necessary thermal treatments. The mass fractions are calculated from the formulation of the composite material taking into account the respective mass yields of the individual components which are achieved under the conditions of the thermal treatment of the composite material (for example via the carbon yields of the carbon precursors used, or more generally the mass yields of the mixtures of all the carbon precursors used for the composite material as well as all the additives, which can be mixed therewith, in the same quantity ratio as in the relevant composite material).

$\rho_i$ refers to the densities of the individual components i of which the composite material consists if said components were thermally treated under the same conditions as the relevant composite material. Thus, for example, $\rho$ (silicon) is the density of the silicon used (including all possible contaminations), $\rho$ (additive a, b, c, etc.) is the densities of the insoluble additives a, b, c, etc. used for the composite material (for example graphite, carbon black, titanium dioxide, etc.) and $\rho$ (amorphous carbon) is the density of the amorphous carbon which is obtained from the mixture of all the mixable carbon precursors used for the composite material after the thermal treatment as well as of all the additives which can be mixed therewith if the raw materials for this are used in the same quantity ratio as in the relevant composite material.

The densities $\rho_i$ are determined pycnometrically with xylol as a liquid (DIN 51901-2006), powders of the individual components which are ground as finely as possible and have a mean particle size of d50 being used within the range of the mean particle size d50 of the composite material to keep the influence of pores which are inaccessible to the liquid to a minimum.

The parameter $\delta$ refers to the variation range according to the invention of the density, which variation range is spanned by the lower density threshold value $\rho^*_1$ when $-\delta$ is used and by the upper density threshold value $\rho^*_2$ when $+\delta$ is used. The parameter $\delta$ has a value of <0.10, in particular <0.09, preferably <0.08, particularly preferably <0.07, very particularly preferably <0.06, for example <0.05.

If the value is $\delta \geq 0.12$, significant regions having inhomogeneous distribution have arisen in the material, which regions thereby result in particle fractions having different densities that deviate significantly from the mean density, as shown in FIG. 1. An inhomogeneous distribution of the components in the material in turn results in disadvantages in the production and processing of the composite material, for example due to undesired material amounts having very high or very low silicon amounts as well as silicon-free particles. As a result, the product has a lower usable capacity than desired. The non-uniform distribution, for example, of the silicon in the electrode also results in further disadvantages in the lithium-ion battery, such as locally non-uniform current densities which can, for example, result in increased ageing.

In the scope of the invention, silicon refers to porous, non-porous, amorphous, partially crystalline, crystalline silicon in any shape or form and in any mixtures thereof, it being possible for metallic contaminants or components to be up to 10 wt.-% in total and for non-metallic contaminants or components (for example comprising the elements hydrogen, boron, carbon, nitrogen, oxygen, phosphorous, fluorine and/or sulphur) to be up to 50 wt.-% in total.

The silicon is preferably partially crystalline or crystalline. It is therefore at least in part crystalline. Whether or not the silicon is at least in part crystalline can be easily determined, for example, by means of an X-ray diffraction analysis (XRD) of the silicon or of the composite material containing the silicon, specifically on the basis of the presence of at least one X-ray diffraction signal which is typical for any crystalline silicon. A powder diffractometer, for example the device EMPYREAN from the PANalytical company with the associated High Score Plus software, can be used for the X-ray diffraction analyses. A Cu Kα cathode ($\lambda$=1.54056 Å) serves as an X-ray source. The powder sample can be measured at room temperature within the range of 2θ=5-90°.

Alternatively, transmission electron microscopy (TEM) can also be used to analyse the silicon or the composite material containing the silicon to see whether crystalline regions in the silicon can be recognised which make up at least 1 wt.-% of the total amount of silicon. For this purpose, for example, a JEOL JEM-2100F transmission electron microscope can be used at a voltage of 200 kV. If it is sufficiently small, the silicon can be analysed directly. The composite material or larger particle samples must, for example, be prepared using microtome sections in order to carry out the TEM analyses.

If there is more than 80 wt.-% silicon in the composite material, the amount of carbon is too low to enclose or envelope the silicon to a sufficient extent for the purposes of the invention. The invention achieves a material having a homogeneous distribution of silicon in the carbon material, which is made clear by the fact that at least 90 wt.-% of the composite material is in the density range between the lower density threshold value $\rho^*_1$ and the upper density threshold value $\rho^*_2$.

Within the scope of the invention, a material having a homogeneous distribution is understood to mean that no regions having a significantly higher or lower accumulation of silicon particles are present, but the silicon particles are uniformly distributed—ideally statistically distributed—in the carbon material formed from the carbon precursor. For example, FIG. 2d shows a homogeneous distribution.

The homogeneous distribution of the silicon particles in the composite material improves the further processing and final application, fewer material losses of the silicon occurring, for example, during grinding and the composite material being subjected to a uniform load when used in lithium-ion batteries or during lithium incorporation. Thus, the volumetric effects of the silicon are distributed more uniformly in the composite material and thus in the electrode than if there were pronounced local accumulations of silicon. Furthermore, a uniform distribution of the silicon in the composite material and thus in the electrode distributes the current density more uniformly when the electrode/battery is charged and discharged such that the risk of local damage to the electrode material of the anode or cathode or the risk of the formation of lithium dendrites by local current density maximums is decreased.

In general, the composite material is present as a powder, meaning that it is a composite powder material.

The composite powder material is present in the form of particles, in particular in the form of (sub)microparticles. According to the typical use of the prefixes 'micro' and 'submicro', 'in the form of (sub)microparticles' and '(sub) microparticulate' refers, in connection with the present invention, to a composite material having a mean particle size (d50) within the range of 100 nm to 500 μm.

The composite material advantageously has a particle size distribution having a mean particle size (d50) of 0.5 to 60 μm, preferably 1-40 μm, particularly preferably 1-25 μm, extremely preferably 2-15 μm. In the scope of the invention, the particle size distribution refers to the volume-based particle size distribution. The mean particle size d50 refers to the median value $X_{50, 3}$, the median value $X_{50, 3}$ being the value at which the cumulative distribution curve $Q_3(X)$ of the particle size distribution is 50%. The median value $X_{50, 3}$ was determined with the aid of the laser granulometry method (ISO 13320-2009), a measuring device of the Sympatec GmbH company with corresponding evaluation software having been used. In the scope of the invention, the volume-based particle size distribution is considered equal to the mass-based particle size distribution because the density of the particles is not considered size-dependent.

According to the invention, the silicon is present in the composite material in the form of particles that are enclosed at least in part by the carbon. Preferably, the ratio of the mean particle size of the silicon to the mean particle size of the composite material is no more than 0.1. In general, it is within the range of 0.0005 to 0.1, preferably within the range of 0.0008 to 0.05. Adherence to the upper threshold of 0.1 facilitates the adjustment of a largely homogeneous density distribution of the composite material. Individual silicon particles which just barely adhere to one or another composite particle, do not contribute significantly to the mass and density of the respective composite particle because the respective composite particle is much larger and heavier than the silicon particle.

According to the invention, the composite material preferably meets the following condition:

$$d50_{Si} \cdot \frac{p_c}{p_{Si}} > s$$

where
- $d50_{Si}$ stands for the mean size of the silicon particle in the unit 'μm'
- $p_c$ stands for the amount of carbon in the composite material, expressed as wt.-%,
- $p_{Si}$ stands for the amount of silicon in the composite material, expressed as wt.-%, and
- s is a security parameter which is 0.02, in particular 0.03, preferably 0.04, particularly preferably 0.05.

Amounts of silicon and carbon can be determined by means of elemental analysis.

The size of the silicon particles in the composite material can be determined using an electron microscope by forming a large number of composite material particle sections, for example by means of fast ion bombardment (FIB), and by measuring and averaging the size of the Si particles in the sectional areas.

If small silicon nanoparticles having a $d50_{Si}$ of 0.01 μm (=10 nm), the amount of carbon would have to be more than two times as high as the amount of silicon to satisfy the above inequality. With a $d50_{Si}$ of 0.03 μm (=30 nm), the above inequality is already satisfied if somewhat more silicon is present than carbon.

If the amounts of carbon and silicon in the composite material are adjusted to the mean size of the silicon particles according to the above condition, sufficient silicon coverage with carbon or embedding in carbon is also ensured to a sufficient degree. This is because the inequality then causes a corresponding increase in the amount of carbon, which also limits the exposed silicon surface of the composite material to a small fraction when smaller silicon nanoparticles having a particularly large surface area are used. It is assumed that a minimum amount of exposed silicon surfaces results in more uniform and reduced SEI formation, as well as a uniform current density distribution to or from the anode, as a result of which the battery ultimately becomes safer. Furthermore, the silicon coverage or the silicon embedding makes it difficult for silicon particles to break out of the composite material. The electrical contact between the individual silicon particles and the current collector is more reliably maintained. Owing to the continued presence of the electrical contact, the particles take part in the charging and discharging processes in the battery in an improved manner and thus remain active. This, like the reduction of SEI formation, also decreases the occurrence of losses of capacity in the case of repeated charging and discharging cycles.

A further aspect of the present invention is a method for production of a composite material.

This method comprises the following steps
a) providing silicon which is preferably crystalline and present, for example, in the form of particles,
b) providing at least one carbon precursor
c) producing a mixture comprising the components from steps a) and b) and
d) creating the composite material by further processing the mixture from step c) comprising a thermal treatment and comminution.

The terms thermal treatment and carbonisation are used synonymously in the scope of the invention.

The silicon from step a) advantageously has a particle size distribution having a mean particle size (d50) of 10 nm to 1 μm, preferably 20 nm to 0.5 μm, particularly preferably 20 nm to 0.3 μm, very particularly preferably 30 nm to 0.2 μm, extremely preferably 40 nm to 180 nm. In the case of an average particle size of less than 10 nm, the silicon is very reactive such that there would be a risk that it could spontaneously ignite in air, unless it has already been passivated by oxidation, which is why it is very laborious to handle. Conversely, if the surface of the material has already been passivated by means of, for example, oxidation, the ratio of the surface area to the volume would be very unfavourable due to the very small mean particle size, i.e. an excessively high amount of the material usually consists of the passivation layer and too little pure silicon remains as an active material. In the case of a particle size of more than 1 μm, the absolute volume change of the particles would be so high, even in the case of partial charging and discharging, that the particles would be broken down into even smaller fragments over a small number of cycles (for example within the first 50 cycles), which would result in an electrical/mechanical loss of contact with the electrode and in further SEI formation, as a result of which the service life/cycle stability of a cell having such a material would be greatly reduced. The particle size distribution having a mean particle size distribution (d50) is measured by means of dynamic light scattering according to ISO 22412-2017.

The carbon precursor from step b) is advantageously selected from the group consisting of pitch, tar, biomaterials, polymers and resin-based raw materials having a carbon yield of >5% or mixtures thereof, preferably pitches, carbohydrates, polyacrylonitriles, polyvinyl chloride, polyimides, phenolic resins or mixtures thereof, particularly preferably pitches having softening temperatures of <400° C. and an ash content of <1%.

A carbon precursor is understood to be all materials from which a carbon material can be obtained by means of the thermal treatment in step d), the carbon yield being at least 5%. The carbon yield of the carbon precursors is determined using the Alcan method (ISO 6998-97). Within the scope of the invention, biomaterials are understood to encompass carbohydrates and lignins.

A preferred carbon precursor is a thermoplastic carbon precursor. Said thermoplastic carbon precursor is a mass that is meltable and carbonisable. Meltable and carbonisable means that the mass can be present as a melt when heated at at least one heating rate within the range of 0.001 K/min to 1000 K/s before it transitions to a solid carbonisation product with a further increase in temperature or after a long period of time at a constant temperature above 100° C. The meltability can be, for example, tested by heating a sample of the mass in a controlled manner and regularly checking whether a melt is present, which can be recognised, for example, by the fact that the sample becomes soft. Certain thermoplastic carbon precursors are, for example, pitches, tars, bitumen, asphalts and polymers and co-polymers, such as polyvinyl chloride, thermoplastic polyacrylonitriles and certain resins and biomaterials.

The mixture obtained according to step c) is advantageously homogeneously distributed. It is particularly advantageous if, when nano silicon is used, said nano silicon is finely distributed, i.e. not present in an agglomerated form in the mixture. The homogeneous distribution in step c) is a beneficial prerequisite for obtaining a product that is as homogeneous as possible according to the subsequent step d).

The thermal treatment in step d) is advantageously selected with the exclusion of oxygen at a temperature up to 400-1600° C., preferably 400-1450° C., particularly preferably 600-1450° C., extremely preferably 800-1350° C. and carried out for a duration of 1 s to 240 h, preferably 1 s to 72 h, particularly preferably 1 s to 24 h, extremely preferably 1 s to 12 h.

Within the scope of this invention, 'with the exclusion of oxygen' means that a maximum of 10% of the anticipated product reacts with oxygen in secondary reactions as a result of reactions with oxygen.

Within the scope of this invention, a thermal treatment is a process in which the sample is heated up to a selected temperature. Within the scope of the invention, the 'duration' refers to the time until the temperature is reached. Producing the composite material can, in addition to the thermal treatment, also include other method steps, for example thoroughly mixing and/or introducing gas into the mixture.

The thermal treatment converts the carbon precursor into a carbon material by means of pyrolysis.

At a temperature of less than 400° C., the carbon precursor has not yet been completely converted into the carbon material, which, depending on the precursor, can lead to various problems, for example toxic residues, insufficient purity, foreign elements, insufficient electrical conductivity, etc. At a temperature greater than 1600° C., the reaction of silicon with the carbon is so rapid that formation of silicon carbide can no longer be ruled out.

In the case of a duration of less than 1 s, such high amounts of volatile decomposition products are released from the carbon precursor that the removal/handling of the decomposition products causes difficulties on a large industrial scale. In the case of a duration of more than 240 h, the separation can no longer be sufficiently prevented.

The ground particles from step d) advantageously have a particle size distribution having d50 of 0.5 to 60 µm, preferably 1-40 µm, particularly preferably 1-30 µm, extremely preferably 2-25 µm, for example 4-20 µm.

In the case of a particle size distribution having a d50 of less than 0.5 µm, the composite particles are only insubstantially larger than nano silicon such that it is no longer possible to speak of a preferred composite material for the purposes of the invention. In addition, the material would be difficult to process into electrodes using conventional processes and facilities due to such a low mean particle size, and the material would have an undesirably high specific surface area, which would in turn result in disadvantageously high, irreversible losses during the formation of the anodes. In the case of a particle size distribution having a d50 of more than 60 µm, the particles would be so large that, in comparison with the typical coating thicknesses (for example 40-120 µm) of the anodes, they would be so large that the homogeneity of the electrode (thickness, load per unit area, porosity) or the calenderability of the electrode is negatively influenced, as a result of which the stability of the electrode and thus of the cell is reduced. The particle size distribution is measured as described above with the aid of the laser granulometry method (ISO 13320-2009), a measuring device of the Sympatec GmbH company with corresponding evaluation software having been used.

In an alternative embodiment of the method for production of a composite material, at least one additive is provided in addition to the components provided in steps a) and b). The mixture produced in c) then generally additionally comprises the additive. A portion of the additive or the total amount of the additive can, however, also be added only in the course of the thermal treatment.

An additive is defined as the component which, after the thermal treatment, mathematically contributes the smaller amount of carbon to the total amount of carbon produced during the thermal treatment compared with the carbon precursor.

In the following, the various types of additives will be described, namely particulate additives (insoluble additives) and miscible additives.

The use of at least one additional additive achieves improved suppression of separation during carbonisation and/or a better carbon yield from the precursor. The reduction of separation achievable by the additive allows a more simple production process for carbonisation and/or a reduction of silicon losses during grinding of the material in step d) and/or an improvement in the homogeneity of the material and the associated improved material properties, such as improved processing of the material to make the anode or improved cycle stability.

In one embodiment, the at least one additive is a component that is insoluble in the at least one carbon precursor, preferably selected from the group consisting of inorganic materials, particularly preferably titanium oxide, silicon dioxide, aluminium oxide, zirconium dioxide, boron oxide, silicon carbide, natural graphites, carbon blacks, amorphous carbons, graphenes, single-wall carbon nanotubes (SWCNTs), multi-wall carbon nanotubes (MWCNTs), carbon nanohorns, vapour-grown carbon fibres or any mixtures thereof, extremely preferably graphites, natural graphites, synthetic graphites, expanded graphites, carbon blacks, graphenes, amorphous carbons, single-wall carbon nanotubes (SWCNTs), multi-wall carbon nanotubes (MWCNTs), carbon nanohorns, vapour-grown carbon fibres or mixtures thereof.

Within the scope of the invention, inorganic materials are understood to be all metals and metalloids, as well as the non-gaseous compounds thereof under standard conditions. Likewise, inorganic materials include all carbon materials and allotropic forms of the element carbon.

Within the scope of the invention, amorphous carbon is understood to be all non-graphitic carbon materials, such as hard carbon, soft carbon, activated carbon, porous carbons and coke. Within the scope of the invention, soft carbon is understood to be graphitisable non-graphitic carbon materials and hard carbon is understood to be non-graphitisable non-graphitic carbon materials.

The smaller the particle size of the silicon used for the C—Si composite material, the more the silicon is able to assume the function of the additive.

The at least one additive advantageously has a mean particle size d50 or a shortest axis of less than 10 µm, preferably less than 8 µm, particularly preferably less than 6 µm, extremely preferably less than 4 µm, exceedingly extremely preferably less than 2 µm. In the case of a size greater than 10 µm, not enough additive particles are present per product particle. For this reason, no positive effect of the at least one additive occurs. It is sufficient if, when a plurality of additives is used, one has a mean shortest axis of less than 10 µm, preferably less than 8 µm, particularly preferably less than 6 µm, extremely preferably less than 4 µm, exceedingly extremely preferably less than 2 µm.

The shortest axis is measured by means of an electron microscope, and the mean particle size d50 is measured, depending on the particle size anticipated for the additive, by means of the laser granulometry method (ISO 13320-2009) or by means of dynamic light scattering (ISO 22412-2017).

The at least one additive is advantageously used in a ratio such that the amount of the at least one additive is 90-1 wt.-%, preferably 70-1 wt.-%, particularly preferably 50-1 wt.-%, extremely preferably 40-1 wt.-% of the part of the composite material not comprising the silicon.

In certain embodiments, less additive is used such that the amount of additive is overall less than 1 wt.-% of the part of the composite material not comprising the silicon. It is often possible to sufficiently suppress the mesophase formation that occurs during the thermal treatment using very small amounts of additive. This applies in particular if the additive is very finely distributed in the mixture, for example if the additive has a mean particle size d50 or a shortest axis of less than 10 µm.

If the amount of the at least one additive is more than 90 wt.-% of the part of the composite material not comprising the silicon, the amount of the remaining residue of the part of the composite material not comprising the silicon, i.e. the carbon matrix, is contained in the composite material only in a very small amount. As a result, the ratio of silicon to carbon matrix is unfavourable and no preferred composite material is present in which the silicon is distributed in the carbon matrix.

The thermal treatment according step d) using an additive is advantageously carried out with the exclusion of oxygen at a temperature up to 400-1600° C., preferably 400-1450° C., particularly preferably 600-1450° C., extremely preferably 800-1350° C. and for a duration of 1 s to 720 h, preferably 1 s to 360 h, particularly preferably 1 s to 240 h, extremely preferably 1 s to 72 h, exceedingly extremely preferably 1 s to 24 h.

At a temperature of less than 400° C., the carbon precursor has not yet been completely converted into the carbon, which, depending on the precursor, can lead to various problems, for example toxic residues, insufficient purity, foreign elements, insufficient electrical conductivity, etc. At a temperature greater than 1600° C., the reaction of silicon with the carbon is so rapid that formation of silicon carbide can no longer be ruled out.

In the case of a duration of less than 1 s, such high amounts of volatile decomposition products are released from the carbon precursor that the removal/handling of the decomposition products causes difficulties on a large industrial scale. In the case of a duration of more than 720 h, the separation can frequently no longer be sufficiently prevented.

The ground particles from step d) advantageously have a particle size distribution having a mean particle size d50 of 0.5 to 60 μm, preferably 1-40 μm, particularly preferably 1-30 μm, extremely preferably 2-25 μm, for example 4-20 μm.

The particle size distribution is, as described above, determined with the aid of the laser granulometry method (ISO 13320-2009), a measuring device of the Sympatec GmbH company with corresponding evaluation software having been used.

In an alternative embodiment, the at least one additive is a component which is miscible with the carbon precursor, selected from the group consisting of resins, polymers, polymerisations initiators, polymer cross-linking agents or mixtures thereof, preferably phenolic resins, resorcinolic resins, cresol resins, alkylphenol resins, cyanate ester resins, epoxy resins, furan resins, polyester resins, alkyd resins, unsaturated polyester resins, vinyl ester resins, acrylic resins, bismaleimide resins, silicone resins, silicone rubbers, polyacrylonitriles, polyimides, polyisoprenes, polybutadienes, polychloroprenes, ethylene propylene diene rubbers, polyvinyl alcohols, polyvinylchlorides, polystyrenes, 2,3-dimethyl-2,3-diphenylbutane, Friedel-Crafts catalysts, urotropine, sulphur, bismaleimides or mixtures thereof.

Mixtures are understood to be both physical and 'chemical' (for example co-polymers) mixtures. Within the scope of the invention, miscible means both soluble and emulsifiable.

The aforementioned carbon precursor materials can also be used as additives for this alternative embodiment. During the thermal treatment, the additive which is miscible with the carbon precursor can react with itself or with the carbon precursor and be pyrolytically changed. To ensure that the additive is reactive, it must be polymerisable and/or cross-linkable.

The amount of the at least one additive is advantageously 90-1 wt.-%, preferably 70-1 wt.-%, particularly preferably 50-1 wt.-%, very particularly preferably 40-1 wt.-% of the portion of the composite material not comprising the silicon.

If the amount of the at least one additive is more than 90 wt.-% of the part of the composite material not comprising the silicon, the amount of the remaining residue of the part of the composite material not comprising the silicon, i.e. the carbon matrix, is contained in the composite material only in a very small amount. As a result, the ratio of silicon to carbon matrix is unfavourable and composite material in which the silicon is homogeneously distributed in the carbon matrix is no longer present for the purposes of the invention. In the case of less than 1 wt.-%, the effect of the at least one additive is not sufficient to achieve an improvement in the homogeneity of the material which is desired according to the invention.

The thermal treatment in step d) using an additive is advantageously carried out with the exclusion of oxygen at a temperature up to 400-1600° C., preferably 400-1450° C., particularly preferably 600-1450° C., extremely preferably 800-1350° C. and for a duration of 1 s to 720 h, preferably 1 s to 360 h, particularly preferably 1 s to 240 h, extremely preferably 1 s to 72 h, exceedingly extremely preferably 1 s to 24 h.

At a temperature of less than 400° C., the carbon precursor has not yet been completely converted into the carbon, which, depending on the precursor, can lead to various problems, for example toxic residues, insufficient purity, foreign elements, insufficient electrical conductivity, etc. At a temperature greater than 1600° C., the reaction of silicon with the carbon is so rapid that formation of silicon carbide can no longer be ruled out.

In the case of a duration of less than 1 s, such high amounts of volatile decomposition products are released from the carbon precursor that the removal/handling of the decomposition products causes difficulties on a large industrial scale. In the case of a duration of more than 720 h, the separation can frequently no longer be sufficiently prevented.

The ground particles from step d) advantageously have a particle size distribution having d50 of 0.5 to 60 μm, preferably 1-40 μm, particularly preferably 1-30 μm, extremely preferably 2-25 μm, for example 4-20 μm.

The particle size distribution is, as described above, determined with the aid of the laser granulometry method (ISO 13320-2009), a measuring device of the Sympatec GmbH company with corresponding evaluation software having been used.

The composite material according to the invention can be used as a single component or as at least one component of the active material for the anode of lithium-ion batteries, lithium-sulphur batteries and/or sodium-ion batteries. Further possible components of the active material are, for example, natural graphites, synthetic graphites, expanded graphites, amorphous carbons (hard carbon, soft carbon) or any mixtures thereof.

In the following, the present invention will be described purely by way of example with reference to advantageous embodiments and with reference to the enclosed drawings. The invention is not limited by the drawings.

BRIEF DESCRIPTION OF THE DRAWINGS

The drawings are schematic representations that can be obtained by means of observation using an optical polarising microscope.

FIG. 1a schematically shows a stage of the formation of the C—Si composite material (basic problem).

FIG. 1b schematically shows another stage of the formation of the C—Si composite material (basic problem).

FIG. 1c schematically shows another stage of the formation of the C—Si composite material (basic problem).

FIG. 1d schematically shows another stage of the formation of the C—Si composite material (basic problem).

DETAILED DESCRIPTION

FIG. 1a-1f schematically show the reaction of a homogeneous green mix consisting of nano silicon (1) with a mesogenic carbon precursor (2).

FIG. 1a shows a homogeneous green mix before the beginning of the thermal treatment.

Figure 2A:
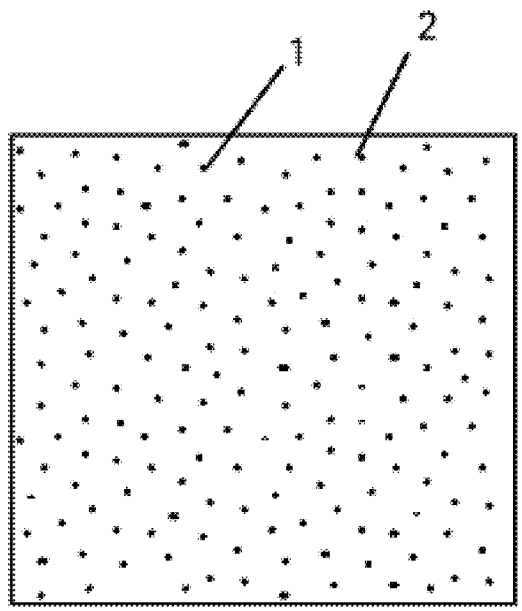
FIG. 2a schematically shows a stage of formation of the C—Si composite material using the thermal treatment according to the invention without additives or using the thermal treatment according to the invention with miscible additives.
Figure 2B:
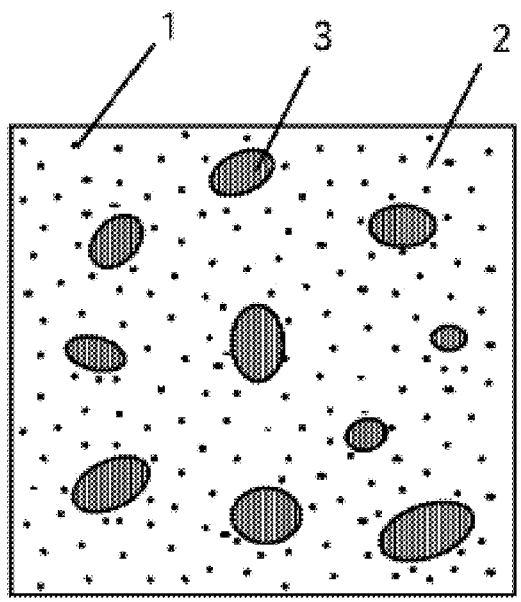
FIG. 2b schematically shows a stage of formation of the C—Si composite material using the thermal treatment according to the invention without additives or using the thermal treatment according to the invention with miscible additives.

FIG. 2b shows the beginning of formation of mesophases (3) during the thermal treatment.

FIG. 1c shows the silicon-free mesophases (3) which grow during the thermal treatment, as a result of which there is a concentration of the nano silicon in the still isotropic phase.

FIG. 1d shows silicon-free anisotropic regions which arise from the mesophases due to the partial coalescence thereof as well as isotropic regions enriched with the silicon. Until the thermal treatment is complete, the structure hardens to form the fully carbonised C—Si composite material having Si-free carbon material regions (5) which arose from the mesophase and Si-enriched regions (6) in the C—Si composite material which arose from the isotropic regions enriched with the silicon.

Figure 1E:
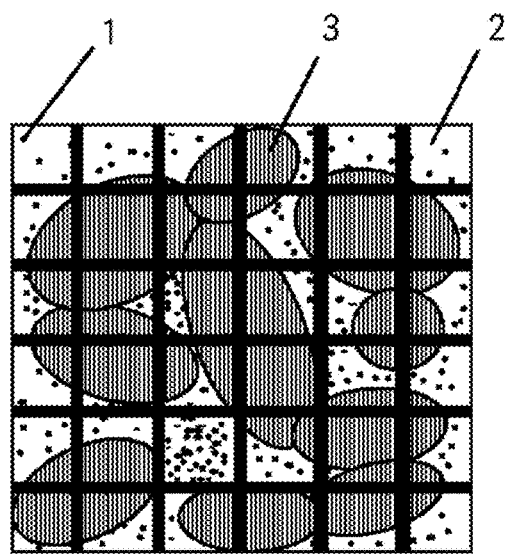
FIG. 1e schematically shows another stage of the formation of the C—Si composite material (basic problem).

By way of the depicted break lines, FIG. 1e shows the schematic subdivision of the thermally treated material into a particle size corresponding to the depicted grid spacing.

Figure 1F:
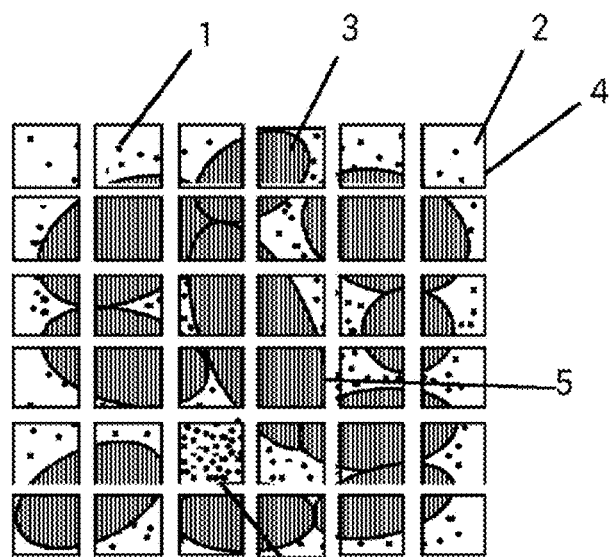
FIG. 1f schematically shows another stage of the formation of the C—Si composite material (basic problem).

FIG. 1f schematically shows the powder obtained after grinding having silicon-free particles consisting of pure carbon material (5), silicon-enriched particles (6) and particles having respective amounts (4) between the extreme possibilities of silicon-free particles only consisting of carbon material and particles consisting almost exclusively of silicon without any detectable carbon material. The range of possible compositions of individual particles leads to the possibility of the particles differing in terms of their respective density depending on what amount of carbon or silicon said particles contain.

FIG. 2a-2d schematically show the reaction of a homogeneous green mix consisting of nano silicon (1) with a mesogenic carbon precursor (2).

FIG. 2a shows a homogeneous green mix before the beginning of the thermal treatment.

FIG. 2b shows the formation of mesophases (3) during the thermal treatment according to the invention. The individual mesophases remain smaller than in FIG. 1b-f, it being possible for the number thereof to be increased by means of increased nucleation during the thermal treatment.

Figure 2C:
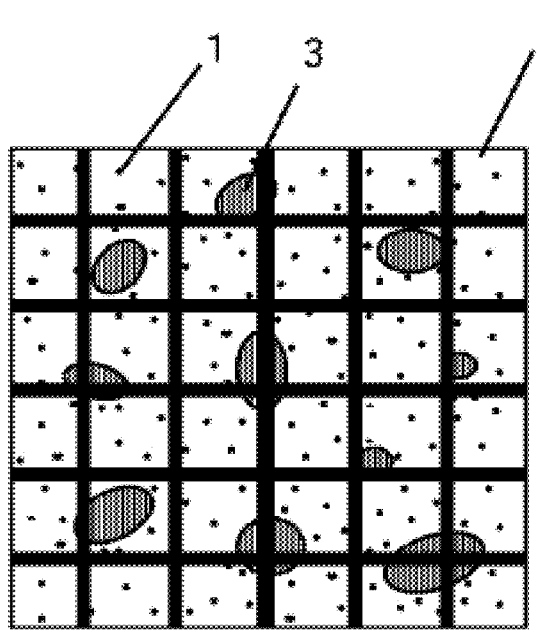
FIG. 2c schematically shows a stage of formation of the C—Si composite material using the thermal treatment according to the invention without additives or using the thermal treatment according to the invention with miscible additives.

By way of the depicted break lines, FIG. 2c shows the schematic subdivision of the composite material after the thermal treatment into a particle size corresponding to the depicted grid spacing of the lines.

Figure 2D:
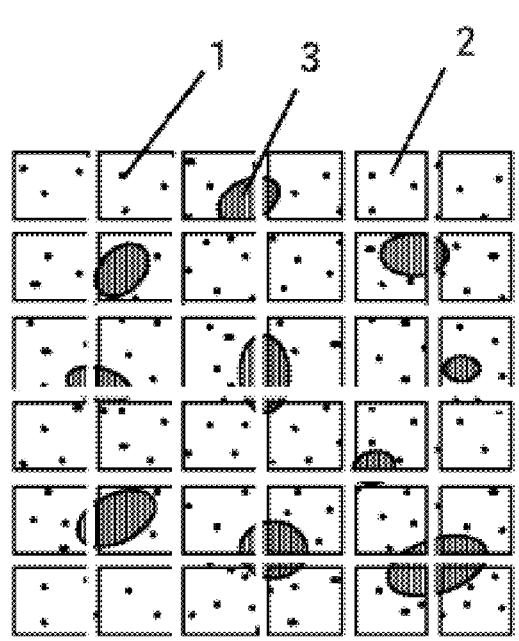
FIG. 2d schematically shows a stage of formation of the C—Si composite material using the thermal treatment according to the invention without additives or using the thermal treatment according to the invention with miscible additives.

FIG. 2d schematically shows the powder obtained after grinding.

In comparison to FIG. 1f, the smaller range of possible compositions of individual compositions results in the particles differing less in terms of their respective density.

FIG. 2a-2d likewise show the process with a miscible additive, which miscible additive is homogeneously mixed with the carbon precursor (2).

FIGS. 3a to 3e schematically show the reaction of a homogeneous green mix consisting of nano silicon (1) with a mesogenic carbon precursor (2) and an insoluble additive (7).

Figure 3A:
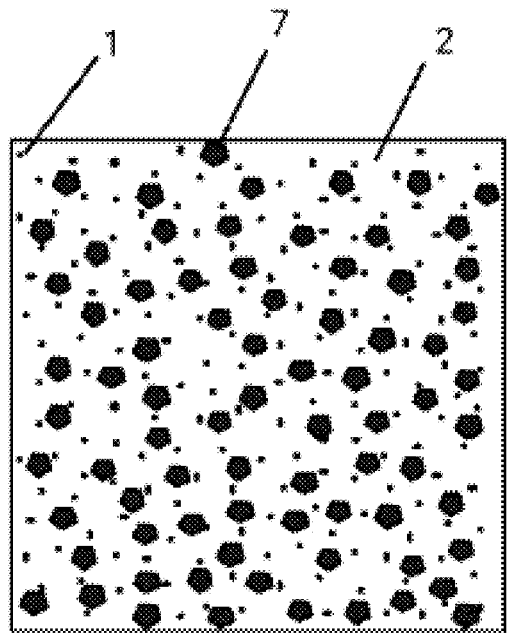
FIG. 3a schematically shows a stage of the formation of the C—Si composite material using the thermal treatment according to the invention with insoluble additives.

FIG. 3a shows a homogeneous green mix before the beginning of the thermal treatment.

Figure 3B:
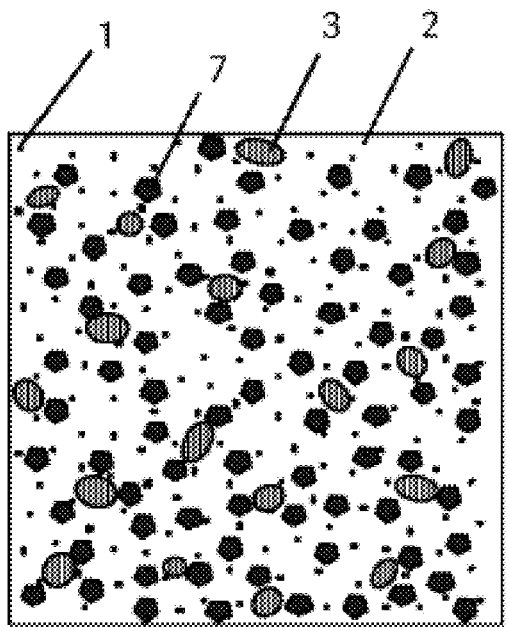
FIG. 3b schematically shows a stage of the formation of the C—Si composite material using the thermal treatment according to the invention with insoluble additives.

FIG. 3b shows the beginning of formation of mesophases (3) during the thermal treatment.

Figure 3C:
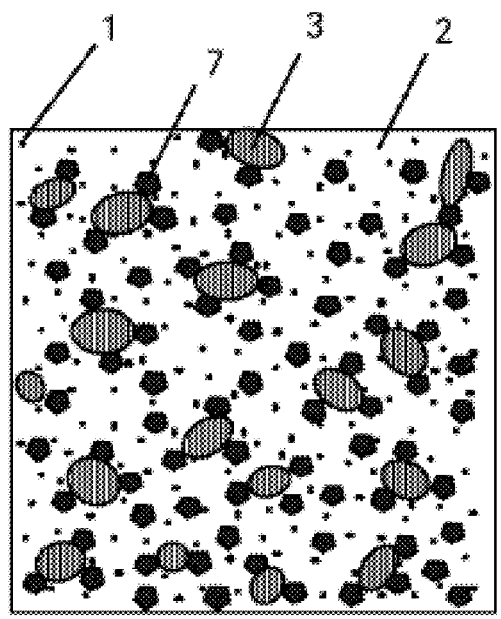
FIG. 3c schematically shows a stage of the formation of the C—Si composite material using the thermal treatment according to the invention with insoluble additives.

FIG. 3c shows the growing mesophases, which are, however, inhibited from growing any further by the additive such that the mesophase growth is reduced compared to the case in FIG. 1. The inhibition can occur by way of an effect of the additive on the viscosity of the mixture during the thermal treatment, which effect is beneficial for the purpose of this invention, and/or by way of increased nucleation of mesophases during the thermal treatment such that the mesophases are smaller and/or more uniformly distributed in the material.

Figure 3D:
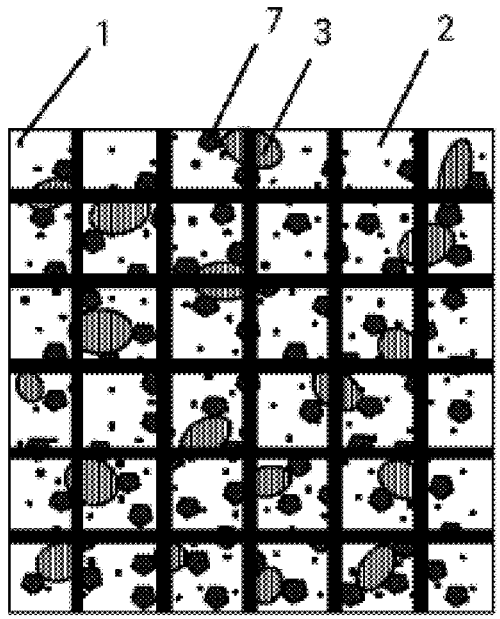
FIG. 3d schematically shows a stage of the formation of the C—Si composite material using the thermal treatment according to the invention with insoluble additives.

By way of the depicted break lines, FIG. 3d shows the schematic subdivision of the composite material into a particle size corresponding to the depicted grid spacing of the lines.

Figure 3E:
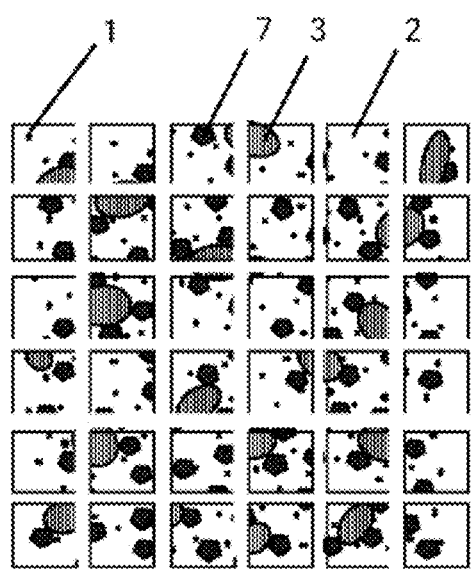
FIG. 3e schematically shows a stage of the formation of the C—Si composite material using the thermal treatment according to the invention with insoluble additives.

FIG. 3e schematically shows the powder obtained after grinding.

In comparison to FIG. 1f or FIG. 2d, the insoluble additive (7) results in additional variability of the possible composition of the individual particles. The density of the individual particles is calculated from the amounts of carbon, silicon and insoluble additive (7) in the particles. The mesophase growth which is reduced as a result of appropriately selecting the insoluble additives allows a more homogeneous particle composition to be obtained overall than for the powder material shown in FIG. 1f.

In the following, the present invention is explained with reference to embodiments, the embodiments not constituting a limitation of the invention.

General Procedure i) Providing silicon and a carbon precursor.

ii) Heating the carbon precursor until said carbon precursor is, for example, molten and fluid enough for the mixing device used. To reduce the processing temperature or to dissolve the carbon precursor, a solvent suitable for this can be used, in which solvent the carbon precursor is (predominantly) soluble at least at an elevated temperature. Alternatively, the silicon can also already be pre-dispersed in a solvent suitable for the carbon precursor and subsequently added to the carbon precursor. To support the deagglomeration of the nano silicon, an ultrasonic treatment (for example using a sonotrode), a particularly high-shear mixer operated at a high speed (for example dissolvers/toothed discs, Ultra-Turrax®) or some other special dispersion device (for example basket mills, colloid mills, stirred ball mills, high-pressure jet and nozzle processes), as known, for example, from the lacquer, paint and ceramics industries.

iii) Mixing of the silicon as a powder or dispersion and of the molten, liquefied, softened and/or dissolved carbon precursor by means of at least one suitable stirring tool, for example a propeller stirrer, a dissolver, a kneader, a planetary mixer or combinations thereof. The objective of the mixing process is to produce a green mix which is as homogeneous as possible and has nano silicon particles which are as deagglomerated as possible, i.e. the nano silicon is homogeneously distributed in the carbon precursor or the carbon precursor solvent mixture.

iv) Optional evaporation/distillative removal of readily volatile constituents of the carbon precursor and/or of the solvent added to the mixture to reduce the material amount for the subsequent step of the thermal treatment. This step may, for example, be necessary to prevent uncontrolled boiling over or foaming of the material during the subsequent thermal treatment, to recover and to recycle the solvent, to reduce the load of the thermal post-combustion in the following step, or to reduce sedimentation until the thermal treatment is complete. The evaporation or distillative removal of the volatile constituents or of the solvent can be done by heating the green mix and optionally supported by decreased pressure or vacuum and/or by flushing the gas space of the container with gases or gas mixtures such as air, nitrogen, argon, carbon dioxide, etc.

v) Thermal treatment of the produced green mix from step iii) or step iv) to carbonise the carbon precursor. The thermal treatment of the green mix is done in a suitable container (for example an open crucible made of steel, graphite or ceramic) with the exclusion of oxygen (for example in a nitrogen or argon atmosphere or in a vacuum) by way of heating to a final temperature within a certain time in a kiln suitable for this purpose, which kiln is preferably equipped with thermal post-combustion for burning volatile exhaust gases. After the final temperature is achieved, the produced mixture can optionally be left in the kiln at the final temperature for a certain period of time to complete the thermal treatment. The kiln can be, for example, a muffle furnace, tubular furnace, chamber kiln, bogie hearth furnace, rotary kiln, annular kiln, tunnel kiln, pusher batt kiln, continuous pulling kiln or any other kiln operated continuously or batch-wise having any kind of heat generation (for example electrical, solar-thermal or by burning solid, liquid and/or gaseous fuels). Afterwards, the thermally treated C—Si composite material is cooled to <400° C. in the kiln by means of controlled or natural cooling before it is removed from the kiln. The cooling can also take place outside the kiln as long as the C—Si composite material is protected from air or oxygen until below 400° C. to avoid oxidation of the C—Si composite material.

vi) Comminution/grinding of the obtained C—Si composite material to the desired particle size by means of crushing and grinding, for example by means of pre-comminution using a jaw crusher, conical crusher, roll crusher, etc. and by means of subsequent single or multi-stage grinding, for example using an impact mill, rotor mill, beater mill, hammer mill, jet mill, ball mill, etc., for example having an integrated sifter for setting the particle size distribution.

Embodiment 1 (Comparison Example, Prior Art)

For steps i)-iii) of the general procedure, 0.23 kg of nano silicon (mean particle size d50 of approx. 100-200 nm, metallic contaminants <3 wt.-%, non-metallic contaminants 5-15 wt.-%, commercially available, for example, from Alfa Aesar or Sigma-Aldrich) were intensively dispersed in 1.0 kg of tetrahydrofuran (for synthesis, stabilised, commercially available, for example, from VWR) in a heatable oil bath in a 5 L glass beaker using a dissolver stirrer (commercially available, for example, from IKA), the dispersion in the oil bath was heated to approx. 50° C., and a total of 1.0 kg of pitch granules, powder or pellets having a softening temperature of approx. 60-120° C. (commercially available, for example, from Deza, Koppers, Rütgers, Bilbaina de Alquitranes) was subsequently added little by little to the heated dispersion. During this procedure, the mixture was intensively stirred for approx. 1 hour using a dissolver stirrer (commercially available, for example, from IKA) to deagglomerate the nano silicon as much as possible until there was a homogeneous dispersion of the nano silicon in the pitch-solvent mixture. For certain batches, propeller or anchor stirrers were also used instead of the dissolver stirrer. If a mixture proved to be difficult to stir, additional tetrahydrofuran was added for dilution until the viscosity of the mixture was low enough for the mixing process.

For step iv) of the general procedure, the tetrahydrofuran was subsequently removed from the mixture by means of distillation at ambient pressure while the mixture was stirred further. For this purpose, for example, a distillation structure having 4-5 L three-necked flasks having an attached, water-cooled Liebig condenser and having an attached stirrer having a stable metal or PTFE stirring blade was used. The distillation was carried out until either at least 70% of the amount of tetrahydrofuran used was removed from the green mix again or until the viscosity of the mixture had increased to such an extent that complete circulation and mixing of the mass using the stirrer was no longer possible at a temperature of the mixture of less than 160-180° C. Subsequently, the cooler and the stirrer were removed and the hot green mix was, in order to prepare for step v) of the general procedure, either transferred to a sufficiently large solvent-, pitch- and temperature-resistant container while still hot or the glass flask broke after being cooled to ambient temperature and the hardened green mix was introduced into a sufficiently large solvent-, pitch- and temperature-resistant container in any form while still cold. A large metal can or a metal bucket or a graphite crucible having at least twice the volume of the green mix, for example, was used as a container.

Subsequently, the green mix was heated in the container in step v) of the general procedure to a final temperature of 700-1000° C. in a chamber kiln having a thermal post-combustion system for burning the produced exhaust gases in a nitrogen atmosphere within approx. 50-200 h and was kept at the final temperature for another 6-12 h. Afterwards, the heating of the kiln was switched off such that it cooled passively. During cooling, the kiln chamber was further flushed with nitrogen to prevent oxidation. As soon as the temperature in the kiln had decreased to <200° C., the nitrogen flushing was stopped, the kiln was opened and the material was removed. For step vi) of the general procedure, the thermally treated material was finally crushed and comminuted by coarse mechanical means, for example using a hammer, and broken into fragments a maximum of 1 cm in size, for example using a hammer, mortar or jaw crusher. The broken material was subsequently pre-ground in an impact mill for coarse grinding to a particle size of approx. 200 µm and ground to the target particle size distribution in a second impact mill having a sifter for fine grinding.

Result of Embodiment 1:

0.51 kg of product powder, mean particle size d50: 5 µm, reversible capacity of 1st cycle: 910 mAh/g, efficiency of 1st cycle: 84%, reversible capacity of 40th cycle: 690 mAh/g, density variation range δ: 0.12.

To electrochemically analyse the materials, electrodes were produced from the ground, pulverulent products, which electrodes were subsequently analysed in laboratory half-cells (button cells 2016) using a Maccor 4000 battery testing device. To produce the electrodes, the powders were mixed with CMC binder (approx. 700,000 g/mol, commercially available from Acros), Super P conductive carbon black (commercially available from Imerys), SFG6 conductive graphite (commercially available from Imerys) and deionised water to make an ink having a suitable viscosity for the subsequent coating process, and the ink was coated onto a copper foil (rough, 20 µm thick, commercially available from Schlenk) using a tabletop film drawing apparatus having a defined doctor blade gap height for the desired areal mass load. The composition of the electrode coating was as follows: active material:conductive carbon black:conductive graphite:binder=88:2:3:7 mass fractions. If necessary, water is used to adjust the viscosity of the ink. The coating was dried in a controlled manner, and round electrode discs (14 mm in diameter) suitable for 2016 button cells (tools and housing parts for button cell production all commercially available from Hohsen) were subsequently punched out of it. The electrode mass on the copper foil was determined by means of weighing, for which purpose the mass of the copper was subtracted from the weight of the electrode discs. The electrode discs were dried (vacuum, >110° C.) and subsequently made into button cells (half-cells) in an argon-filled glove box with round, punched-out lithium foil (16 mm in diameter, commercially available from Alfa Aesar) as a counterelectrode as well as a separator (GF/D, commercially available from Whatman) and an electrolyte. The electrolyte (commercially ready-mixed from UBE) had the following composition: 1 mol/L of lithium hexafluorophosphate dissolved in ethylene carbonate:ethylmethyl carbonate (1:1, vol.)+2% vinylene carbonate+10% fluoroethylene carbonate.

The cells were charged and discharged ('cyclised') in a controlled manner on a battery testing device (Maccor, series 4000), the lithium counterelectrode also serving as a potential reference in the half-cell structure. The battery test was carried out as follows: formation (3 cycles): charging: 0.1 C CC to 20 mV, CV to C/100; discharging: 0.1 C CC to 1.5 V. Cyclisation (after forming): charging: 0.5 C CC to 20 mV, CV to C/20; discharging: 0.5 C CC to 1.5 V (CC=constant current, CV=constant voltage).

For use of the C—Si composite material as an anode material for lithium-ion batteries, said C—Si composite materials can be used either alone or, for example, mixed with graphite anode material in any manner to make the anode material (active material), it being possible to adjust the specific capacity via the mixing ratio.

The electrochemistry of the following embodiments was also determined according to the described method.

The density range of the composite material was determined by separating the particles into liquids having a defined density on the basis of the floating method or on the basis of the gravity separation of minerals based on their density in heavy liquids.

To determine the density range of the composite material, the density of the heavy liquid was varied around the range of the mean density of the composite material, and the achievable separation of the composite material into a 'lighter' and a 'heavier' fraction was thus determined in each case. Particles whose density is greater than the density of the liquid can settle, whereas particles having precisely the same density as the liquid continue to be suspended therein and particles whose density is lower than the density of the liquid float therein. Because the separation of the particles according to their density only takes place very slowly in the gravitation field due to the very low density difference between the particles and the liquid, a centrifuge was used to accelerate the process, which centrifuge was thermostated to prevent a temperature influence on the density of the heavy liquid.

Suitable heavy liquids include, for example, defined mixtures of liquids having a high density (for example 1,2-dibromopropane, 1,3-dibromopropane, 1,2,3-tribromopropane) and liquids having a low density (for example toluene, xylol, decane, dodecane). The density of the liquids or of the mixtures thereof is measured using the oscillation method according to DIN EN ISO 15212-1 (2009) at the temperature at which the actual experiment for separating the particles also takes place. In all experiments, care was taken to ensure that the composition and thus the density of the mixed liquids was not changed due to evaporation of more readily volatile components.

To determine the density range of the powder, about 1-2 g of powder was weighed into centrifuge tubes having a volume of approx. 15 mL, precisely the same amount being weighed into each centrifuge tube, and filled with a heavy liquid within the range having a precisely known density within the range of the mean density of the material to a total volume of at least 10-12 mL and subsequently tightly sealed. The liquid volume was at least four times as great as the bulk volume of the powder to make a spatial separation of the particles according to their density in the liquid possible. To prevent agglomerates or air inclusions, the suspension was treated in an ultrasonic bath for 15 min.

A series of samples each having slightly different heavy liquids was prepared, the density of which heavy liquids varied in 0.01 g/cm$^3$ steps. Subsequently, all samples were centrifuged in the centrifuge at maximum speed for at least 48-72 h.

For samples in which the powder completely settled to the bottom, the density of the heavy liquids was lower than the density of all the powder particles. For samples in which the powder completely floated to the top, the density of the heavy liquids was greater than the density of all the powder particles. In both cases, the density of the heavy liquids used in each case thus indicated a lower or upper limit for the possible density of the powder particles.

In the density range in between, the liquid having the particles suspended therein was divided into three volume fractions (upper third, middle third and lower third) of equal size by removing the individual partial volumes of the suspensions from the centrifuge tube one after another using pipettes. The three individual fractions were subsequently dried to constant weight and the powder residue per fraction was weighed (accuracy at least 0.1% of the total mass of the composite material used). It was thus possible to determine the amount of particles which settled to the bottom (lower third) or floated to the top (upper third). The middle fraction, in which the particles had precisely the same density as the heavy liquid, served to control and optionally correct the masses in the lower and upper fractions because it had been assumed that particles having this density were uniformly distributed in all three fractions.

By variation of the density of the heavy liquids, the densities of the heavy liquids are sought in successive, analogous experiments, in which heavy liquids only 5 wt.-% of the composite material used floated or settled. For this purpose, the mass fractions of the experiments, which in each case had slightly different densities of the heavy liquids, were plotted against the respective densities of the heavy liquids in the individual fractions, and the density of the heavy liquids for which 5 wt.-% of the composite material used was in the upper or lower fraction was determined from the data. These densities thus corresponded to the lower density threshold value $\rho*_i$ or the upper density threshold value $\rho*_2$, and 90 wt.-% of the particles of the composite material were within the density range between $\rho*_1$ and $\rho*_2$. The amount of the difference $|\rho-\rho*_{1,2}|$ between the mean density $\rho$ of the composite material and the lower density threshold value $\rho*_1$ or upper density threshold value $\rho*_2$ is the amount of the variation range $\delta$ of the density. If the amounts of the differences $|\rho-\rho*_{1,2}|$ between the mean density $\rho$ of the composite material and the lower density threshold value $\rho*_1$ or the lower density threshold value $\rho*_2$ were not equal, the greater of the two amounts was used to determine the amount of the variation range $\delta$.

The density range of the following embodiments was also determined according to the described method.

Embodiment 2

Like embodiment 1, but with a more rapid thermal treatment in step v). For this purpose, steps i) to iv) and vi) were carried out in embodiment 2 in the same manner as in embodiment 1. However, in embodiment 2, the thermal treatment of step v) takes place within 3-12 h. For this purpose, the green mix was heated in the container to a final temperature of 800-1000° C. in a chamber kiln having a thermal post-combustion system for burning the produced exhaust gases in a nitrogen atmosphere within approx. 3-12 h and subsequently optionally kept at the final temperature for another 1-3 h. As a result of the more rapid heating to the final temperature, large quantities of pyrolysis gases, for which the kiln and its thermal post-combustion system were designed, were released in a relatively short amount of time. In addition, the risk of overfoaming was greater, which is why a sufficiently large container was used. Afterwards, the heating of the kiln was switched off such that it cooled passively. During cooling, the kiln chamber was further flushed with nitrogen to prevent oxidation. As soon as the temperature in the kiln had decreased to <200° C., the nitrogen flushing was stopped, the kiln was opened and the material was removed.

Result of Embodiment 2:

0.53 kg of product powder, mean particle size d50: 5 µm, reversible capacity of 1st cycle: 1110 mAh/g, efficiency of 1st cycle: 85%, reversible capacity of 40th cycle: 780 mAh/g, density variation range $\delta$: 0.06.

Embodiments 3a-c

Embodiment 3a

In contrast with embodiment 1, a pulverulent additive which is insoluble in the carbon precursor was additionally added in step iii) of the general procedure in embodiment 3a and was mixed into the green mix such that the additive was finally homogeneously present in the green mix like the nano silicon.

For embodiment 3a, 0.23 kg of nano silicon (mean particle size d50 of approx. 100-200 nm, metallic contaminants <3 wt.-%, non-metallic contaminants 5-15 wt.-%, commercially available, for example, from Alfa Aesar or Sigma-Aldrich) were intensively dispersed in 1.2 kg of tetrahydrofuran (for synthesis, stabilised, commercially available, for example, from VWR) in a heatable oil bath in a 5 L glass beaker using a dissolver stirrer (commercially available, for example, from IKA), the dispersion in the oil bath was heated to approx. 50° C. and a total of 0.8 kg of pitch granules, powder or pellets having a softening temperature of approx. 60-120° C. (commercially available, for example, from Deza, Koppers, Rütgers, Bilbaina de Alquitranes) and 0.1 kg of graphite powder having a particle size d50 of 3-6 µm (commercially available, for example, from Imerys, Graphit Kropfmühl, SGL Carbon) were subsequently added little by little to the heated dispersion as an additive in steps i) to iii) of the general procedure. During this procedure, the mixture was intensively stirred for approx. 1 hour using a dissolver stirrer (commercially available, for example, from IKA) to deagglomerate the nano silicon and the graphite powder as well as possible until there was a homogeneous dispersion of the nano silicon and the graphite powder in the pitch-solvent mixture.

Steps iv)-vi) of the general procedure were subsequently carried out in the same manner as in embodiment 1.

Result of Embodiment 3a:

0.58 kg of product powder, mean particle size d50: 5 µm, reversible capacity of 1st cycle: 1120 mAh/g, efficiency of 1st cycle: 86%, reversible capacity of 40th cycle: 800 mAh/g, density variation range $\delta$: ~0.04.

Embodiment 3b

Like embodiment 3a but with an nm-scale pulverulent additive which is insoluble in the carbon precursor in step iii). In embodiment 3b, carbon black was used as an additive instead of the graphite powder of embodiment 3a.

For embodiment 3b, 0.23 kg of nano silicon (mean particle size d50 of approx. 100-200 nm, metallic contaminants <3 wt.-%, non-metallic contaminants 5-15 wt.-%, commercially available, for example, from Alfa Aesar or Sigma-Aldrich) were intensively dispersed in 2.0 kg of tetrahydrofuran (for synthesis, stabilised, commercially available, for example, from VWR) in a heatable oil bath in a 5 L glass beaker using a dissolver stirrer (commercially available, for example, from IKA), the dispersion in the oil bath was heated to approx. 50° C., and a total of 0.8 kg of pitch granules, powder or pellets having a softening temperature of approx. 60-120° C. (commercially available, for example, from Deza, Koppers, Rütgers, Bilbaina de Alquitranes) and 0.1 kg of carbon black having a mean primary particle size d50 of <1 µm (commercially available, for example, from Imerys, Orion, Cabot) were subsequently added little by little to the heated dispersion as an additive in steps i) to iii) of the general procedure. During this procedure, the mixture was intensively stirred for approx. 1 hour using a dissolver stirrer and/or a propeller or anchor stirrer (commercially available, for example, from IKA) to deagglomerate the nano silicon and the carbon black powder as well as possible until there was a homogeneous dispersion of the nano silicon and the carbon black in the pitch-solvent mixture. Steps iv)-vi) of the general procedure were subsequently carried out in the same manner as in embodiment 3a.

Result of Embodiment 3b:

0.56 kg of product powder, mean particle size d50: 5 µm, reversible capacity of 1st cycle: 1100 mAh/g, efficiency of 1st cycle: 83%, reversible capacity of 40th cycle: 780 mAh/g, density variation range δ: 0.03.

Embodiment 3c

Like embodiment 3a or embodiment 3b but with two different additives which are insoluble in the carbon precursor in step iii) such that the two additives were finally homogeneously present in the green mix like the nano silicon.

In embodiment 3c, a combination of the graphite powder as an additive in embodiment 3a and the carbon black as an additive in embodiment 3b having a mass ratio of 1:1 was used, i.e. 0.05 kg of the graphite powder from embodiment 3a and 0.05 kg of the carbon black from embodiment 3b. The remaining materials (types, amounts) and steps of embodiment 3c were used and carried out as in embodiment 3b.

Result of Embodiment 3c:

0.57 kg of product powder, mean particle size d50: 5 µm, reversible capacity of 1st cycle: 1110 mAh/g, efficiency of 1st cycle: 85%, reversible capacity of 40th cycle: 790 mAh/g, density variation range δ: 0.04.

Embodiments 4a-c

Embodiment 4a

In contrast with embodiment 1, an additive which does not form mesophases was additionally added in step iii) or step iv) of the general procedure in embodiment 4a and was mixed into the green mix such that the additive was finally homogeneously present in the green mix.

For embodiment 4a, 0.25 kg of nano silicon (mean particle size d50 of approx. 100-200 nm, metallic contaminants <3 wt.-%, non-metallic contaminants 5-15 wt.-%, commercially available, for example, from Alfa Aesar or Sigma-Aldrich) were intensively dispersed in 1.0 kg of tetrahydrofuran (for synthesis, stabilised, commercially available, for example, from VWR) in a heatable oil bath in a 5 L glass beaker using a dissolver stirrer (commercially available, for example, from IKA), the dispersion in the oil bath was heated to approx. 50° C., and a total of 0.55 kg of pitch granules, powder or pellets having a softening temperature of approx. 60-120° C. (commercially available, for example, from Deza, Koppers, Rütgers, Bilbaina de Alquitranes) was subsequently added little by little to the heated dispersion in steps i)-iii) of the general procedure. During this procedure, the mixture was intensively stirred for approx. 1 hour using a dissolver stirrer (commercially available, for example, from IKA) to deagglomerate the nano silicon as well as possible until there was a homogeneous dispersion of the nano silicon in the pitch-solvent mixture. Subsequently, 0.5 kg of phenolic resin (novolak powder having a softening temperature of approx. 60-120° C.) (commercially available, for example, from Süd-West-Chemie, Allnex, Hexion) was added little by little as an additive and was intensively stirred again for approx. 1 hour. Steps iv)-vi) of the general procedure were subsequently carried out in the same manner as in embodiment 1.

If it was difficult to mix in an additive in the pitch-solvent mixture below the melting point of the additive, it was helpful to already start step iv) of the general procedure during the mixing processes, i.e. evaporate the solvent little by little and increase the temperature of the mixture to above the melting point of the additive, in order to support mixing with the additive.

Result of Embodiment 4a:

0.45 kg of product powder, mean particle size d50: 5 µm, reversible capacity of 1st cycle: 1070 mAh/g, efficiency of 1st cycle: 82%, reversible capacity of 40th cycle: 770 mAh/g, density variation range δ: 0.04.

Embodiment 4b

In contrast with embodiment 1, a cross-linkable additive which does not form mesophases was additionally added in step iii) or step iv) of the general procedure in embodiment 4b and was mixed into the green mix such that the additive was finally homogeneously present in the green mix.

For embodiment 4b, 0.23 kg of nano silicon (mean particle size d50 of approx. 100-200 nm, metallic contaminants <3 wt.-%, non-metallic contaminants 5-15 wt.-%, commercially available, for example, from Alfa Aesar or Sigma-Aldrich) were intensively dispersed in 1.0 kg of tetrahydrofuran (for synthesis, stabilised, commercially available, for example, from VWR) in a heatable oil bath in a 5 L glass beaker using a dissolver stirrer (commercially available, for example, from IKA), the dispersion in the oil bath was heated to approx. 50° C., and a total of 0.8 kg of pitch granules, powder or pellets having a softening temperature of approx. 60-120° C. (commercially available, for example, from Deza, Koppers, Rütgers, Bilbaina de Alquitranes) was subsequently added little by little to the heated dispersion in steps i)-iii) of the general procedure. During this procedure, the mixture was intensively stirred for approx. 1 hour using a dissolver stirrer and/or a propeller or anchor stirrer (commercially available, for example, from IKA) to deagglomerate the nano silicon as well as possible until there was a homogeneous dispersion of the nano silicon in the pitch-solvent mixture. Subsequently, 0.45 kg of unsaturated polyester resin (commercially available, for example, from Reichhold, Synthopol, BÜFA) as an additive and 6 g of 2,3-dimethyl-2,3-diphenylbutane (commercially available, for example, from Acros, AkzoNobel) as a free-radical initiator were added and intensively stirred again for approx. 1 hour.

Steps iv)-vi) of the general procedure were subsequently carried out in the same manner as in embodiment 1. During the thermal treatment in step v), the additive or the pyrolysis thereof caused considerable foaming, which is why the container for the material in needed to be sufficiently large in this step.

Result of Embodiment 4b:

0.49 kg of product powder, mean particle size d50: 5 µm, reversible capacity of 1st cycle: 1100 mAh/g, efficiency of 1st cycle: 84%, reversible capacity of 40th cycle: 780 mAh/g, density variation range δ: 0.04.

Embodiment 4c

In contrast with embodiment 1, a cross-linking agent was additionally added as an additive in step iii) or step iv) of the general procedure in embodiment 4c and was mixed into the green mix such that the additive was finally homogeneously present in the green mix.

In contrast with embodiment 1, 0.85 kg of pitch granules, powder or pellets having a softening temperature of approx. 60-120° C. (commercially available, for example, from Deza, Koppers, Rütgers, Bilbaina de Alquitranes) were used in steps i)-iii) in embodiment 4c. The remaining materials (types, amounts) and steps of embodiment 4c were used and carried out as in embodiment 1. In step iii) of the general procedure, 0.09 kg of sulphur (powder, at least 99% purity, commercially available, for example, from VWR, Carl-Roth, Sigma-Aldrich) was added after the complete dispersion of the nano silicon and mixed into the green mix for about ½ hours such that the additive was homogeneously present in the green mix before step iv) was started. The reaction of the sulphur with the pitch during heating in step iv) caused hydrogen sulphide to be released from about 120-150° C. To prevent overfoaming in step iv) or in step v) of the general procedure, a slow temperature increase, a sufficiently large reaction vessel and a powerful stirrer were helpful.

The reaction gases can be introduced into a wash bottle with sodium hydroxide solution during step iv) by flushing the flask with nitrogen to absorb the hydrogen sulphide, or the hydrogen sulphide burned during the thermal treatment in step v) in a suitably designed thermal post-combustion system having exhaust gas purification.

Result of Embodiment 4c:

0.55 kg of product powder, mean particle size d50: 5 μm, reversible capacity of 1st cycle: 1090 mAh/g, efficiency of 1st cycle: 82%, reversible capacity of 40th cycle: 750 mAh/g, density variation range δ: ~0.03.

On the basis of the examples and drawings, one obtains composite materials according to the invention having particularly narrow density distributions, in particular if, during the process for production of the composite material, the temperature of the mixture is kept within a temperature range only for as short a time as possible, in which temperature range a portion of the mixture forms mesophases or is molten, because mixture constituents which are in mesophases or molten promote the formation of anisotropic regions, and/or a particulate additive (insoluble additive) is added, and/or a miscible additive is added.

If, for the conversion of the carbon precursor in the mixture into carbon, the temperature of the mixture can only be increased very slowly due to the conditions of the production facilities, it is advisable to add additives to the mixture in order to achieve the density distribution according to the invention. This can, for example, be necessary if a large amount of the mixture having a large volume and a comparatively small surface area is heated in a kiln in which the thermal treatment is intended to take place. The mixture is then heated only slowly, for example due to the limited thermal conductivity and high thermal capacity of the mixture, both of which result in a thermally inert behaviour, such that there may be a risk of pronounced mesophase formation if no additives are added. The additives then cause a reduction in mesophase formation and thus ultimately usually cause a homogeneous density of the obtained composite material.

If, however, a more rapid increase in the temperature of the mixture is possible (for example if the mixture is placed in a hot kiln or a heating zone in small portions or in a finely distributed manner to increase the possible heating rate of the mixture by, for example, increasing the surface area exposed to heat in relation to the mass of the mixture or only a very small mixture volume is heated in a rapidly heating kiln or in a hot zone), it is usually unnecessary to add an additive to suppress mesophase formation to such an extent that a density distribution according to the invention results.

Of course, an additive can be added to the mixture even if the temperature is rapidly increased. This usually results in a further increase in the homogeneity (i.e. to an even more narrow density distribution) of the obtained composite material.

LIST OF REFERENCE SIGNS 1 nano silicon
2 carbon precursor
3 mesophase
4 particle having carbon and silicon
5 particle having pure carbon material
6 particle enriched with silicon
7 insoluble additive

The invention claimed is:

1. A composite material, comprising:
silicon and a carbon matrix, wherein a proportion of silicon in the composite material is 1-80 wt.-% and at least 90 wt.-% of the composite material is in a density range between a lower density threshold value $\rho^*_1$ and an upper density threshold value $\rho^*_2$, wherein the density threshold values $\rho^*_{1,2}$ have the following relation:

$$\rho^*_{1,2}=(1\pm\delta)\cdot\rho$$

wherein $\rho$ is a mean density of the composite material and $\pm\delta$ is a variation range between the upper density threshold value $\rho^*_2$ and the lower density threshold value $\rho^*_1$, an amount of $\delta$ being <0.10; and wherein the composite material meets the following condition:

$$d50_{Si}\cdot\frac{p_c}{p_{Si}}>s$$

where $d50_{Si}$ stands for a mean size of the silicon particle in the unit 'μm'

$p_c$ stands for an amount of carbon in the composite material, expressed as wt.-%, $p_{Si}$ stands for an amount of silicon in the composite material, expressed as wt.-%, and s is a security parameter which is 0.02.

2. The composite material according to claim 1, wherein the composite material is present as a (sub)microparticle composite powder material.

3. The composite material according to claim 1, wherein the composite material has a particle size distribution having a mean particle size (d50) of 0.5 to 60 μm.

4. The composite material according to claim 1, wherein the silicon is present in the form of particles which are at least in part enclosed in the carbon matrix.

5. The composite powder material according to claim 4, wherein a ratio of a mean particle size of the silicon to a mean particle size of the composite powder material is 0.0005 to 0.1.

6. The composite material according to claim 1, wherein at least 3 wt.-% of the composite material is in density range(s) outside a range extending from a lower density threshold value $\rho^*_3$ to an upper density threshold value $\rho^*_4$, wherein the density threshold values $\rho^*_{3,4}$ have the following relation:

$$\rho^*_{3,4}=(1\pm\delta_{min})\cdot\rho$$

wherein $\rho$ is a mean density of the composite material and $\pm\delta$ min is a variation range between the upper density threshold value $\rho^*_4$ and the lower density threshold value $\rho^*_3$, the amount of $\delta_{min}$ being $\geq 0.005$.

7. The composite material according to claim 1, wherein the silicon is at least in part crystalline.

8. A use of the composite material according to claim 1 as the only component or as at least one component of an active material for the anode of lithium-ion batteries, lithium-sulphur batteries and/or sodium-ion batteries.

* * * * *